US008479763B2

(12) United States Patent
Hill et al.

(10) Patent No.: US 8,479,763 B2
(45) Date of Patent: Jul. 9, 2013

(54) ELECTRONIC VENTING AND MECHANICAL ROLL OVER VALVE

(75) Inventors: David Hill, Commerce Township, MI (US); Saurin Mehta, Troy, MI (US); Scott McCleary, White Lake, MI (US); Scott Garabedian, Warren, MI (US)

(73) Assignee: Inergy Automotive Systems Research (Société Anonyme), Bruxelles (BE)

( * ) Notice: Subject to any disclaimer, the term of this patent is extended or adjusted under 35 U.S.C. 154(b) by 697 days.

(21) Appl. No.: 11/910,343

(22) PCT Filed: Mar. 31, 2006

(86) PCT No.: PCT/EP2006/061218
§ 371 (c)(1),
(2), (4) Date: May 27, 2008

(87) PCT Pub. No.: WO2006/103286
PCT Pub. Date: Oct. 5, 2006

(65) Prior Publication Data
US 2009/0056680 A1   Mar. 5, 2009

(30) Foreign Application Priority Data
Apr. 1, 2005   (EP) ..................................... 05102570

(51) Int. Cl.
*F16K 17/36*   (2006.01)
*F16K 21/18*   (2006.01)
*F16K 31/08*   (2006.01)
*F16K 24/00*   (2006.01)
*B60K 15/035*   (2006.01)
*F02M 33/00*   (2006.01)

(52) U.S. Cl.
USPC ............... 137/389; 137/39; 137/43; 137/202; 251/129.03; 123/520

(58) Field of Classification Search
USPC ........... 137/39, 43, 389, 202; 251/11, 129.03; 123/520, 521
See application file for complete search history.

(56) References Cited

U.S. PATENT DOCUMENTS

| 3,099,285 | A | * | 7/1963 | Berg et al. ..................... 137/220 |
| 3,703,165 | A | | 11/1972 | Hansen |
| 4,578,186 | A | * | 3/1986 | Morin ............................. 210/90 |
| 4,887,578 | A | | 12/1989 | Woodcock et al. |
| 4,991,615 | A | | 2/1991 | Szlaga et al. |
| 5,054,528 | A | | 10/1991 | Saitoh |
| 5,413,137 | A | * | 5/1995 | Gimby .......................... 137/200 |

(Continued)

FOREIGN PATENT DOCUMENTS

DE   199 22 453 A1   1/2000
EP   0 257 731 A1   3/1988

OTHER PUBLICATIONS

U.S. Appl. No. 11/718,140, filed Apr. 27, 2007, Hill, et al.
U.S. Appl. No. 11/813,544, filed Jul. 9, 2007, Hill.

(Continued)

*Primary Examiner* — Craig Schneider
*Assistant Examiner* — Atif Chaudry
(74) *Attorney, Agent, or Firm* — Oblon, Spivak, McClelland, Maier & Neustadt, L.L.P.

(57) ABSTRACT

A valve including a mechanical part, e.g. a float, for performing a ROV function (Roll Over Valve) and an electronic part, e.g. an electronically controlled solenoid valve, for performing a venting function.

13 Claims, 1 Drawing Sheet

U.S. PATENT DOCUMENTS

| | | | |
|---|---|---|---|
| 5,971,002 | A | 10/1999 | Turpin et al. |
| 6,601,617 | B2 | 8/2003 | Enge |
| 6,626,156 | B2 * | 9/2003 | Rosseel .................. 123/516 |
| 6,986,341 | B2 * | 1/2006 | Mitani et al. ............ 123/520 |
| 7,347,191 | B2 * | 3/2008 | Atwood et al. ........... 123/516 |
| 2001/0020487 | A1 | 9/2001 | Rosseel |
| 2007/0233360 | A1 | 10/2007 | Hill et al. |
| 2007/0272219 | A1 | 11/2007 | Hill |

OTHER PUBLICATIONS

U.S. Appl. No. 11/816,677, filed Aug. 20, 2007, Wouters, et al.
U.S. Appl. No. 12/064,333.
U.S. Appl. No. 12/064,351.

* cited by examiner

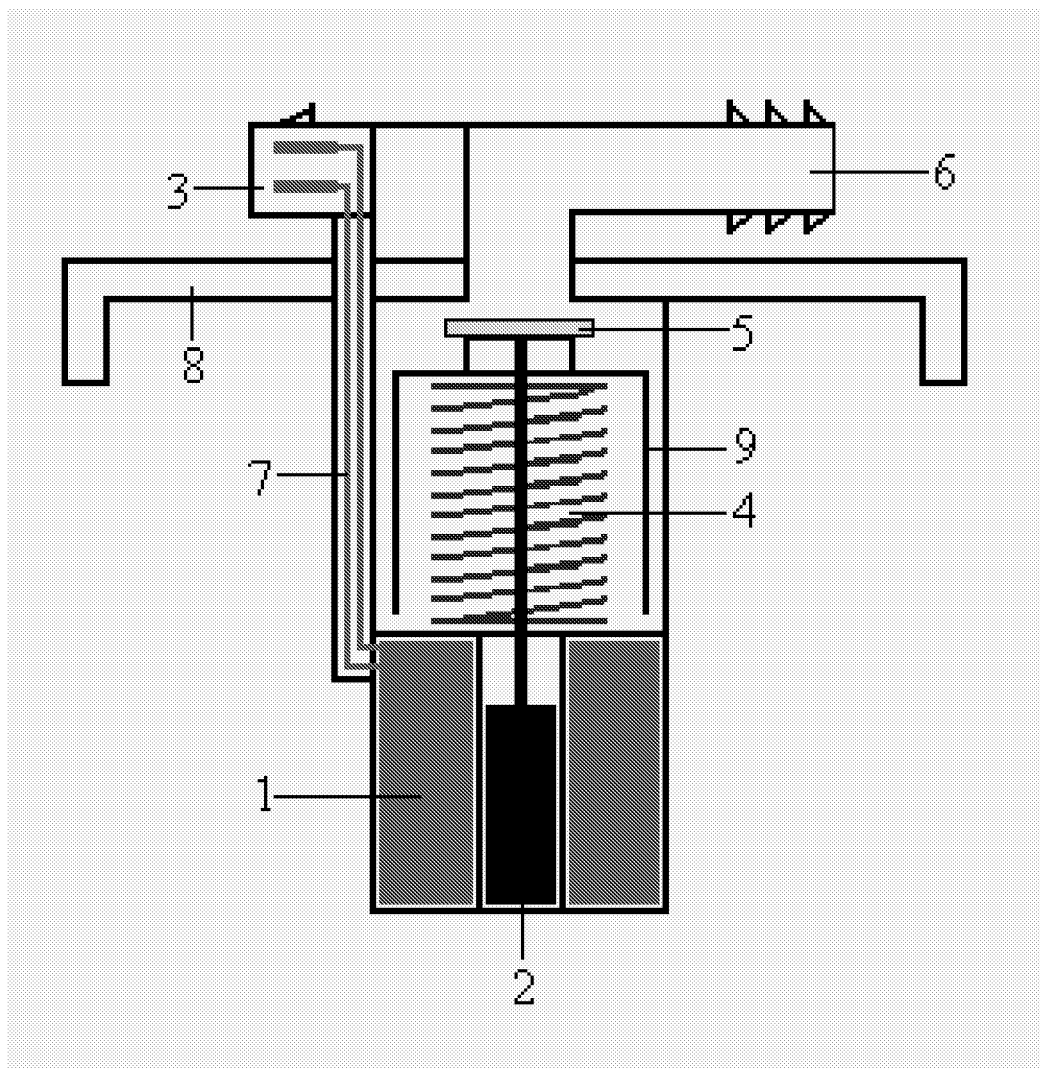

ELECTRONIC VENTING AND MECHANICAL ROLL OVER VALVE

Increasingly stringent environmental standards have resulted in the passage of regulations which necessitate a significant reduction in fuel vapors escaping from a vehicle fuel tank during refueling and normal operation. These regulations generally strive to essentially eliminate fuel vapor escaping to the atmosphere. The resultant emission control systems are referred to as onboard refueling vapor recovery (ORVR) systems.

In a typical ORVR system, at least one control valve is placed in the vapor transmission path between the fuel tank and the canister. The primary purpose of the control valve is to enable the transmission of vapor while preventing the transmission of liquid fuel to the collection canister. If liquid fuel reaches the canister, a situation referred to as liquid carryover (LCO), fuel can collect within the canister, saturating it (and making it inefficient).

Most of the existing ORVR control valves are mechanical valves which are normally open, providing a vapor path between the fuel tank and the canister. However, these normally open valves must be adaptable to close off the vapor path between the fuel tank and the canister during conditions such as vibration, slosh, and vehicle tilting which might otherwise result in a LCO condition. Typical valves include a buoyant member with a bias toward an open position. The valve is responsive to slosh, vibration, and tilting conditions to close the vapor passage. Therefore, it is generally called a ROV or Roll Over Valve. Roll over valves have been in use for several years and have traditionally been operated by only the physical tilting action of the tank with no electronic controls.

Besides the ROV, ORVR systems generally also include a FLVV or Fill limit Venting Valve which closes off the passage to the canister when the tank is at full level. Both valves may be combined in one assembly. Such a combined (integrated) valve allows what normally would be two parts molded onto a fuel tank to be combined into one molded on part. The cost of production is slightly lower since there is only one part to make instead of two. There also is a reduction in the amount of fuel vapor lines needed. The FLVV (Fill Limit venting Valve) is the valve being eliminated in this process.

However, the above described mechanical valves (even integrated) are often slow to respond and include many moving parts which eventually deteriorate, thereby adversely affecting operation of the refueling valve.

To solve that problem, solenoid valves have been developed like the ones described in U.S. Pat. No. 4,887,578 and U.S. Pat. No. 6,601,617.

US '578 describes (in FIG. 4) a valve which combines, in one assembly, a solenoid valve which opens when a supply nozzle is inserted in the fill neck of the tank, and a ROV which closes off the passageway to the canister in the case of waves, tilting of tank.

The valve of US '617 is selectively opened and closed in connection with whether a fueling event occurs and whether the fuel tank is full. In one embodiment (pictured in FIG. 5), the solenoid valve assembly also comprises a buoyant member acting as a ROV.

One disadvantage of both integrated valves (integrating a mechanical ROV in a solenoid valve assembly) is that since the buoyant member is only moving owed to physical tilting action of the tank or of the liquid inside of it, fine tuning of the refueling process is not possible. This means that these valves cannot handle anomalies due to turbulence in the tank; neither can they provide early venting after refueling at full level. Another disadvantage is the number of parts used in these assemblies (both ROV and solenoid valves having their own moving part) and hence, their size and cost.

The present invention namely aims at solving these problems by providing an integrated and compact valve capable of safely and finely adjusting venting during refueling, and even during normal operation of the tank. Besides limiting or even eliminating the risk of LCO, the valve of the invention allows to eliminate any anomalies due to turbulence in the tank and to reopen the valve to vent pressure directly after the refueling operation, further refining the refueling process and mitigating the risk of fuel vapor escaping out the nozzle. Other advantages of the present invention will appear in view of the detailed description which follows.

DETAILED DESCRIPTION

The object of the present invention is thus a safety valve for a liquid tank comprising a buoyant member that is actuated both mechanically for roll over protection and electronically to selectively vent fuel vapors.

More specifically, the present invention concerns a valve comprising
- a housing having at least one inlet orifice and at least one outlet orifice;
- a buoyant member moving inside said housing in response to the presence of liquid inside the housing and able of closing the outlet orifice when in a high position; and
- a solenoid or magnetic coil able to act on the position of the buoyant member when energized.

In other words, the buoyant member is free to move (under the action of liquid) when the solenoid is not energized, but forced in a given position—generally to close the valve but in certain circumstances, to open it—when the solenoid is energized i.e. when current is made to circulate in the coil.

The safety valve of the invention is intended for the ventilation circuit of a tank capable of containing any liquid. In particular, the liquid can be a fuel, a brake fluid or a lubricant. More particularly, the liquid is a fuel and the valve is an ORVR valve as described above. The tank can be intended for any use, especially for equipping a vehicle and, more especially, for equipping a motor vehicle.

The valve of the invention comprises a housing with at least one inlet orifice and at least one outlet orifice in order to allow vapor to flow through it. By "vapor" is meant particularly the outside air to be introduced into the tank or the gaseous mixtures which are contained in the tank and the discharge of which is to be made possible. As regards a fuel tank, these gaseous mixtures comprise essentially air and fuel vapor.

The outlet orifice is generally located in the upper part of the valve and makes it possible, when shut off, to close the valve. This orifice may be equipped with a gasket, for example with a flat gasket of the elastomeric diaphragm type.

The valve of the invention also comprises a buoyant member, which is often of float, which may be of any shape but is generally a cylinder provided with a head or closure plug—which may be flat, conical, in the shape of a needle . . . —capable of closing the outlet orifice. The float is associated with the float head in any conventional way. Preferably, it is integral with it. The float and the float head can be produced in one piece or be produced separately and assembled. The float head may be equipped with a gasket, for example with an elastomeric diaphragm gasket, assisting the sealing of the valve in the closed position.

The valve housing generally comprises a lower casing where the buoyant member must be capable of sliding, and an upper casing or cover. The lower casing generally comprises a bottom or support for the buoyant member (or float).

In the case of an ORVR valve, the cover is generally provided (or integrated with) a tube connected to the vent line which leads to the canister. Both pieces (lower casing and cover) can be molded in one piece, or they can be separate pieces assembled for instance by means of clipping, snap fitting, welding . . . .

The housing can have any shape, often adapted internally to the sliding of the buoyant member. Most often, it has, for this purpose, a constant inner cross-section, at least in the lower casing. It is, in particular, at least in this part, internally cylindrical.

In the valve of the invention, the buoyant member (float) plays the role both of ROV element and of moving part cooperating with the solenoid in order to close off the valve when instructed to (through electronic signals coming from a processor).

To perform the ROV function, the buoyant member (float) may be assisted by a weighted element (see for instance U.S. Pat. No. 5,971,002, the content of which is incorporated by reference in the present application). This element is used for helping displacing the said float in the event of an inclination of the casing. It may be a ball of high-density material (like metal for instance). This ball is generally movable on a support. In the event of an inclination of the tank, the ball is displaced on or off the support, drives the float upwards and causes the outlet orifice of the valve to be shut off by the head of the float, even before the level of liquid rises in the valve, thus completely preventing liquid from passing into the ventilating circuit.

In the event that the tank is overturned, the ball of high-density material likewise pushes the float towards the valve-closing position and keeps it in this position by gravity. In the event of a rise in the level of liquid in the tank, this liquid enters the valve via the lower casing generally through apertures in the support of the float, drives the float upwards and likewise causes the outlet orifice of the valve to be shut off.

The valve of the invention may also use a spring in order to balance out the weight of the float and/or the weighted element (the case being) so that the mechanical roll over function operates properly.

Advantageously, the sliding of the float (buoyant member) inside the casing is carried out by means of fitted guidance. Thus, the float virtually cannot be displaced at all in a direction other than the vertical direction. This fitted guidance may be brought about, in particular, by the appropriate radial dimensioning of the two parts in contact and/or by means of a set of longitudinal ribs on the float and/or on the casing.

The valve of the invention also comprises a solenoid or magnetic coil able to act on the position of the float when energized. This solenoid is electrically connected to a power source, through adequate wires and connections. It is preferably also connected to a processor aimed at controlling it i.e. at energizing it in response to at least one electronic signal.

The solenoid may be located anywhere on/in the valve, provided in can act on the position of the float. In a preferred embodiment, the solenoid is located at the bottom of the float and acts as support for the float.

The solenoid may directly act on the position of the float in the case said float comprises at least one magnetic part. Alternatively, the solenoid may act on the position of a magnetic part which in turn acts on the position of the float. In one preferred embodiment, a magnetic shaft is integrated or linked to the float, said shaft being able to force the float upwards (to close the valve), and eventually also downwards (to re-open the valve, in response to energizing the solenoid. Preferably, the magnetic part moves independently of the float in the downward direction, so as not to weigh down the float, and diminish its buoyancy.

In this embodiment, the magnetic shaft—which is generally a rather heavy part—may play the role of the metallic ball described above. Also, in this embodiment, the solenoid is preferably located under the float—acting as its support—and comprises an opening though which the shaft can slide.

The component elements of the valve may be produced from any material. Preferably, the housing (cover and lower casing) is produced from a thermoplastic-based material. In this case, it is, of course, expedient to select the material or materials in such a way that they withstand the stresses of use. In particular, of course, the selected materials preferably are inert towards the liquids with which they are likely to be in contact, especially towards fuels. Since these parts are preferably made by injection molding, said plastics are also preferably chosen in order to be suitable for that processing technique. Such plastic materials are well known to a person of ordinary skill in the art.

As to the solenoid and the shaft, they are preferably metallic. They may respectively be overmolded by the material of the lower casing or of the float. Overmolding of the solenoid allows it to be isolated from the fuel.

The invention also relates to an ORVR system using such a valve, to a method for ventilating a fuel tank using said system and to a fuel tank equipped with such a valve/system.

More specifically, the present invention also relates to an ORVR system comprising a fuel tank, a canister and a vent line from the tank to canister, said vent line being equipped at the tank side, with a valve as described above.

The method and location for fastening the valve to the fuel tank may be selected in any conventional way suitable for the specific conditions. Preferably, the valve is assembled directly on the upper wall of the tank or on the flange of the pump-gauge module by any known technique (welding, snapping . . . ).

As explained earlier, the solenoid of the valve is preferably connected to a processor aimed at controlling it i.e. at energizing it in response to at least one electronic signal. This processor may be the CPU (or central processing unit of the vehicle), the FSCU (or fuel system control unit, for vehicles equipped with such a device) or any other processor available on board of the vehicle. In vehicles equipped with an intelligent fuel system (IFS or fuel system equipped with an FSCU), it preferably is the FSCU.

In a method using such a system, during refueling, the valve preferably remains open until a fuel level sensor indicates that the fuel in the tank has met a specified level (generally the maximum level). In this case, the valve is powered, shutting off communication to the canister and causing the filling nozzle's actuator to trip, ending the refueling operation. In other words, in such a method, the afore mentioned electronic signal is coming from a fuel level sensor and during refueling, the solenoid is not energized and allows the valve to remain open until the fuel level reaches a specified level, at which moment the solenoid forces the valve to close.

There are mainly 2 embodiments of this method as related to normal operation (i.e. non refueling conditions).

According to a first one, during normal operation, the solenoid is energized and forces the valve to close unless a given pressure is exceeded, upon which the solenoid forces the valve to open.

In this embodiment:
 the float acts as a failsafe in case of a malfunction of the solenoid or its controller. In this case the float would prevent liquid fuel from reaching the canister.

a pressure sensor would be actuating the valve via communication through an electronic controller of some sort (processor): see above.

According to a second embodiment, during normal operation, the solenoid is not energized, except right after refueling, where it may be energized to force the valve to re-open.

In this embodiment, the solenoid allows to adjust the characteristics of the fueling process. For example, by using the level sensor signal, any anomalies due to turbulence in the tank may be eliminated. The valve could also be re-opened to vent pressure directly after the refueling operation, further refining the refueling process and mitigating the risk of fuel vapor escaping out the nozzle.

DRAWING/ILLUSTRATION

FIG. 1 is a cut away view of the inside of a valve according to one embodiment of the present invention.

It is a schematic view, on which the vapor inlet and some other well known valve features have not been represented (since they are very well known to a person of ordinary skill in the art).

Part number 1 is calling out the magnetic coil that is used to electronically force the valve closed. Part number 2 is the main shaft of the electronic valve. The end of the shaft sits below the sealing plunger (part 5). It pushes upward when energized to close the valve. Part number 3 is the wire harness connector that is necessary for connecting to the coil. Part number 4 is the spring. This helps balance out the weight of the valve shaft (part 2) and the float (part 9) so that the mechanical roll over function of this valve still operates properly. Part number 5 is the sealing plunger. It will provide a leak proof seal when it is forced upward to close the valve. Part number 6 is the main port for the fuel vapor outlet. It may not have a barbed type of connection, but something is necessary for it to retain the hose that will be attached. Part number 7 is the electrical connection that is needed from the coil (part 1) to the wire harness connector (part 3). Part number 8 is the top of the outer valve housing that will sit on top of the fuel tank. Part number 9 is the float. When the fuel level is high enough, this is what will mechanically shut the valve.

In this embodiment, the weight of the shaft (part 2) has become somewhat of a replacement for the weighted metal ball that sat at the bottom of some roll over valves. Not all roll over valves have that weight designed into them though. Another feature is that this valve could ideally be mounted inside the flange (which bears most of the accessories of tank like the pump, gauge . . . ) to eliminate another weld on the tank (and the risk of leak associated).

The invention claimed is:

1. A safety valve for a liquid tank comprising:
   a buoyant member that is actuated both mechanically for roll over protection and electronically to selectively vent fuel vapors;
   a housing including at least one inlet orifice and at least one outlet orifice, the buoyant member moving inside said housing in response to presence of liquid inside the housing and configured to close the outlet orifice when in a high position;
   a solenoid or magnetic coil configured to act on a position of the buoyant member when energized, the solenoid or magnetic coil including a shaft rigidly coupled to the buoyant member so as to move together with the buoyant member, wherein the shaft extends at least partly within the solenoid or magnetic coil, and
   a spring that provides a force that balances the weight of the buoyant member,
   wherein the buoyant member is disposed around a periphery of the spring.

2. The valve according to claim 1, wherein the buoyant member rests on the solenoid.

3. The valve according to claim 1, wherein a magnetic shaft is integrated or linked to the buoyant member, the magnetic shaft configured to force the buoyant member upwards, in response to energizing the solenoid.

4. The valve according to claim 3, wherein the solenoid comprises an opening though which the magnetic shaft can slide.

5. An ORVR system comprising:
   a fuel tank;
   a canister;
   a vent line extending from the tank to canister, the vent line including, at the tank side, a valve according to claim 1; and
   a processor to which the solenoid of the valve is connected and configured to energize the solenoid in response to at least one electronic signal.

6. The ORVR system according to claim 5, wherein the fuel tank is part of a fuel system including a FSCU (fuel system control unit), and wherein the processor is the FSCU.

7. The valve according to claim 1, wherein the solenoid or magnetic coil forces the buoyant member in a first direction to open the outlet orifice and in a second direction to close the outlet orifice.

8. The valve according to claim 1, wherein the shaft is disposed at least partly within the spring.

9. The valve according to claim 8, wherein the shaft extends directly from the solenoid or magnetic coil through the spring.

10. A method for venting a fuel tank comprising:
    providing an ORVR system comprising:
       a fuel tank;
       a canister;
       a vent line extending from the tank to canister, the vent line including, at the tank side,
       a safety valve including
          a buoyant member that is actuated both mechanically for roll over protection and electronically to selectively vent fuel vapors,
          a housing including at least one inlet orifice and at least one outlet orifice, the buoyant member moving inside said housing in response to presence of liquid inside the housing and configured to close the outlet orifice when in a high position, and
          a solenoid or magnetic coil configured to act on a position of the buoyant member when energized; and
       the ORVR system including a processor to which the solenoid of the valve is connected, the processor being configured to energize the solenoid in response to at least one electronic signal,
    wherein the electronic signal comes from a fuel level sensor, and wherein during refueling, the solenoid is not energized and allows the valve to remain open until the fuel level reaches a specified level, at which moment the solenoid forces the valve to close, the solenoid or magnetic coil including a shaft rigidly coupled to the buoyant member so as to move together with the buoyant member,
    wherein the shaft extends at least partly within the solenoid or magnetic coil, and
    wherein during normal operation, the solenoid is not energized, except right after refueling, when the solenoid may be energized to force the valve to re-open.

11. The method according to claim 10, wherein during normal operation, the solenoid is energized and forces the valve to close unless a predetermined pressure is exceeded, upon which the solenoid forces the valve to open.

12. The method according to claim 10, wherein energizing the solenoid or magnetic coil shuts off communication between the fuel tank and canister, which causes a filling nozzle filing the tank to shut off.

13. The method according to claim 10, wherein the solenoid or magnetic coil forces the buoyant member in a first direction to open the outlet orifice and in a second direction to close the outlet orifice.

* * * * *